W. KOOTZ.
SHOCK ABSORBER FOR VEHICLES.
APPLICATION FILED APR. 5, 1907.
973,516.
Patented Oct. 25, 1910.
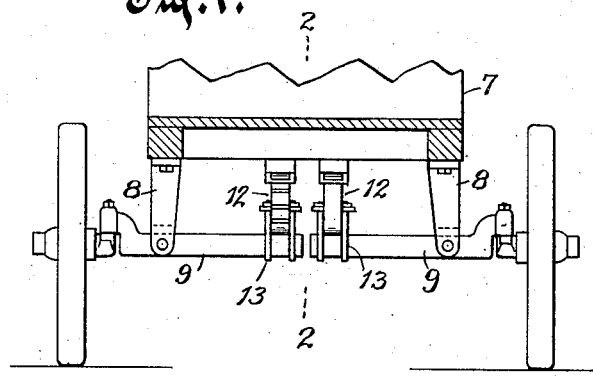
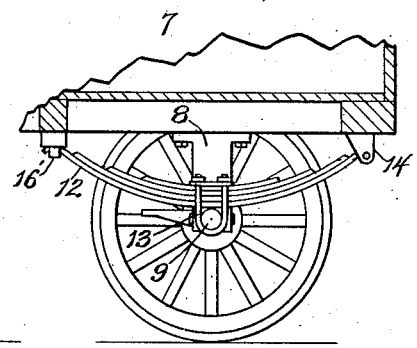
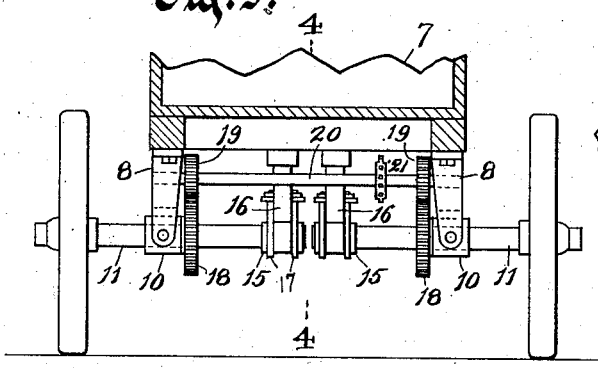
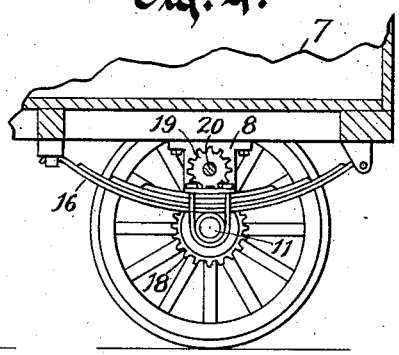
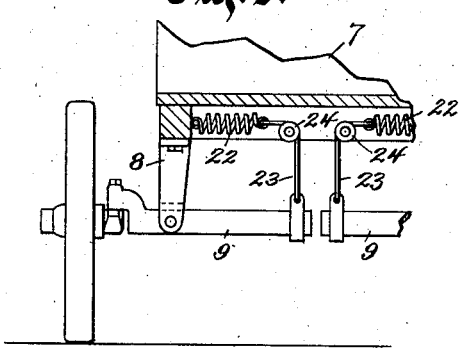
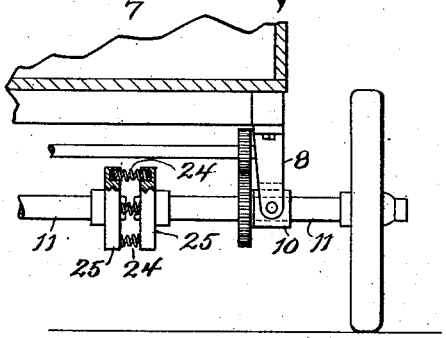
Witnesses:
C. H. Keeney
Anna F. Schmidtbauer
Inventor:
William Kootz,
By Benedict, Morsell & Caldwell.
Attorneys.

UNITED STATES PATENT OFFICE.

WILLIAM KOOTZ, OF MILWAUKEE, WISCONSIN.

SHOCK-ABSORBER FOR VEHICLES.

973,516.  Specification of Letters Patent. Patented Oct. 25, 1910.

Application filed April 5, 1907. Serial No. 366,619.

*To all whom it may concern:*

Be it known that I, WILLIAM KOOTZ, residing in Milwaukee, in the county of Milwaukee and State of Wisconsin, have invented new and useful Improvements in Shock-Absorbers for Vehicles, of which the following is a description, reference being had to the accompanying drawings, which are a part of this specification.

My invention relates to automobiles, and more particularly to means for minimizing the shocks and jars incident to undulations and obstructions on the common roads.

A further object is to provide a simple, economical, and efficient vehicle with means by which the shocks due to undulations and obstructions of the road are minimized or obviated without the necessity of using pneumatic tires which are very expensive initially, and a source of constant expense for repairs due to punctures, wear etc.

With the above, and other incidental objects in view, the invention consists of the devices and parts, or their equivalents, as hereinafter set forth.

In the accompanying drawings, Figure 1 is a sectional view of a front portion of an automobile body and its steering wheels; Fig. 2 is a sectional view taken on line 2—2 of Fig. 1; Fig. 3 is a sectional view of a rear portion of the body and its propelling wheels; Fig. 4 is a sectional view taken on line 4—4 of Fig. 3; Fig. 5 is a view of a front fragment of an automobile body showing a modified form of device for absorbing shocks; and Fig. 6 is a view of a rear fragment of an automobile body showing still another modified form of shock absorbing device.

Like numerals of reference refer to like parts throughout the different views.

The body of the vehicle or automobile may be of any desirable construction adapted for the purpose desired, and in the drawings I have illustrated a simple box body 7 provided with depending brackets 8, 8, the lower ends of which are bifurcated and are adapted to have the front axles 9 pivoted thereto, and to have a collar 10 surrounding the rear axles 11, 11 pivoted to the bracket depending from the rear portion of the body. The outer ends of the front axles are provided with the ordinary knuckle pivot joints and wheels, and the rear or power axle with ordinary wheels connected rigidly thereto, and may be provided with differential gears, if desired. Both front and rear axles are divided centrally and the inner ends of the front axle are rigidly connected to the middle portions of leaf springs 12, 12, by means of clips and straps 13, 13. The forward ends of the springs are pivoted to the body 7 by means of brackets 14, 14 and the rear ends are carried in guides 16', 16' also fastened to the body 7.

The inner ends of the rear axles are provided with collars 15, 15 which are rigidly connected to leaf springs 16, 16 by clips and straps 17, 17 and these springs are attached to the body 7 in precisely the same way as the front springs are. By this arrangement of the collars on the rear axle provision is made for allowing the axle to be rotated by means of the toothed wheels 18, 18 meshing with pinions 19, 19 carried on shaft 20 suitably journaled in brackets 8, 8. The shaft 20 is rotated by means of a sprocket wheel 21 or any other suitable means connecting the shaft to the source of power. The teeth of the gear 18 and the pinions 19 are spaced a sufficient distance apart to allow for a slight movement vertically, in relation to each other, so as to provide for the swing of the axle, but not enough as to allow the teeth to get out of mesh.

In the modified construction shown in Fig. 5 the leaf springs are omitted and in place thereof coiled springs 22, 22, cables 23, 23 and pulleys 24, 24 are used to accomplish the same purpose, that is, to provide yielding means connected to the inner ends of the axle and the vehicle body.

The modified structure shown in Fig. 6 is provided with a divided axle similar to the constructions before mentioned but instead of the inner ends of the axle being connected to the vehicle body by yielding means, the yielding means or springs 24, 24 are disposed between the faces of two disks 25, 25 one being attached to the end of each shaft and thus in effect will operate the same as the constructions before mentioned.

In operation, the parts are positioned as shown in the drawings, and upon striking an obstruction the wheels and that portion of the axle extending outwardly from its pivotal connection with the bracket will swing upwardly and the inner end of said axle will be swung downwardly exerting a pull on the spring or yielding member connected thereto and the shock will be almost entirely absorbed by the yielding member.

and the vehicle will ride over the obstruction without any jar and thereby accomplish the same function as pneumatic tires, but in a more efficient manner, and without the first initial cost of the tires and the expense, annoyance and discomfort attendant upon possible punctures.

What I claim as my invention is:

1. A shock absorber for vehicles, comprising a two-part axle, each part of which is medially pivoted to a bracket connected to a vehicle frame, collars on said axle near the inner ends, yielding means connected to said collars and the vehicle frame, and means for rotating said axle.

2. A shock absorber for vehicles, comprising a two-part axle, each part of which is medially pivoted to a bracket connected to a vehicle frame, collars on said axles near their inner ends, yielding means connected to said collars and the vehicle frame, gears on said axle, pinions in mesh with said gears, a shaft upon which said pinions are mounted, and means for rotating the shaft.

3. A shock absorber for vehicles, comprising a two-part axle, each part of which is medially pivoted to a bracket connected to a vehicle frame, collars on said axles near their inner ends, and springs connected to said collars and the vehicle frame, gears on said axle, pinions in mesh with said gears, a shaft upon which said pinions are mounted, and means for rotating the shaft.

In testimony whereof, I affix my signature, in presence of two witnesses.

WILLIAM KOOTZ.

Witnesses:
C. H. KEENEY,
ANNA F. SCHMIDTBAUER.